No. 853,875. PATENTED MAY 14, 1907.
A. B. HAMILTON.
FEED BAG.
APPLICATION FILED DEC. 10, 1906.
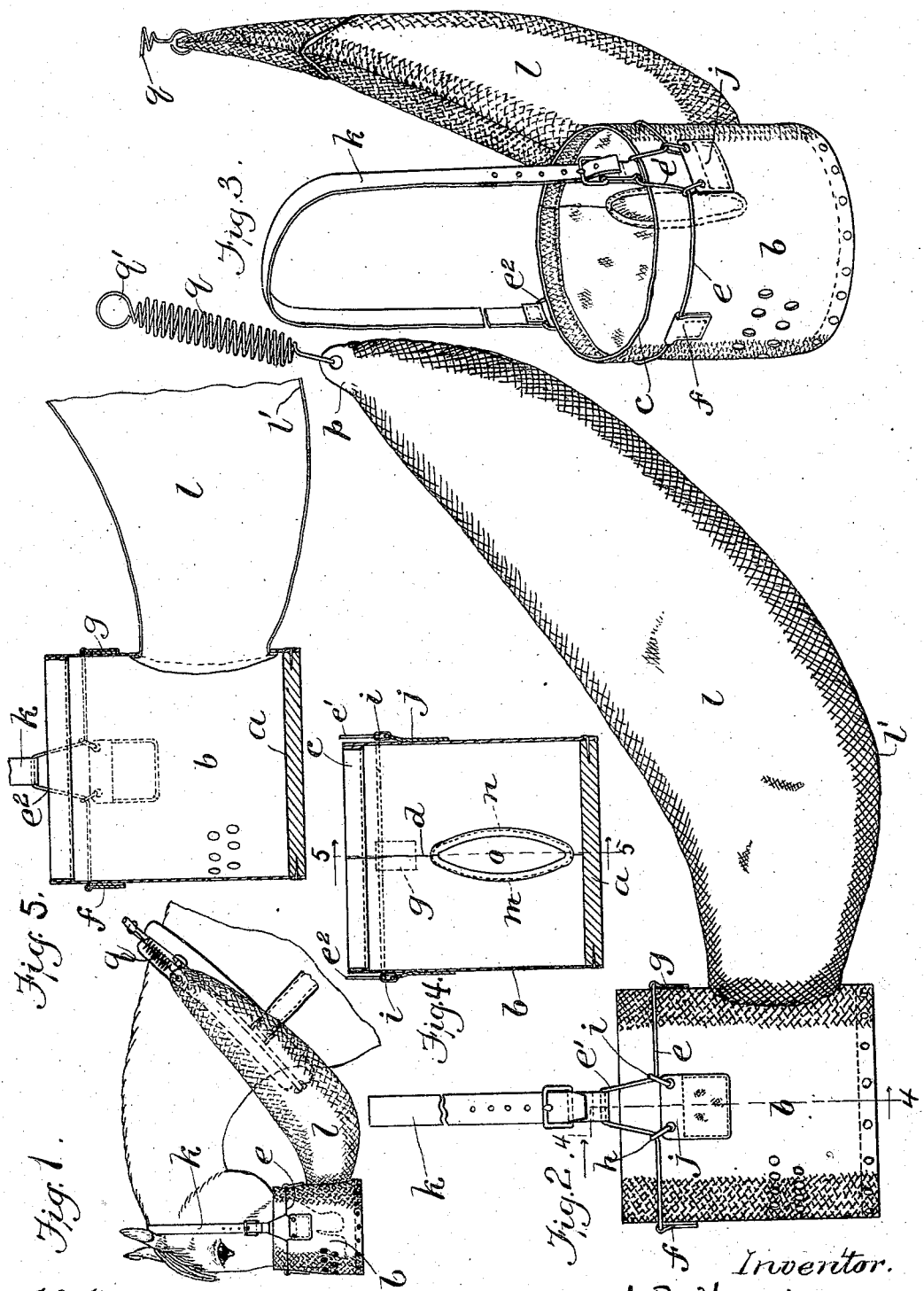
Witnesses
Forest Roulstone
E. Batchelder
Inventor.
A. B. Hamilton
By Wright Brown Quinby May
Att'ys.

UNITED STATES PATENT OFFICE.

ADDINGTON B. HAMILTON, OF BOSTON, MASSACHUSETTS, ASSIGNOR OF TWO-THIRDS TO JAMES F. O'BRIEN, OF BOSTON, MASSACHUSETTS.

FEED-BAG.

No. 853,875.  Specification of Letters Patent.  Patented May 14, 1907.

Application filed December 10, 1906. Serial No. 347,193.

*To all whom it may concern:*

Be it known that I, ADDINGTON B. HAMILTON, of Boston, in the county of Suffolk and State of Massachusetts, have invented certain new and useful Improvements in Feed-Bags, of which the following is a specification.

This invention relates to bags from which draft animals may be fed while away from the stable and standing harnessed to a vehicle.

The principal object of the invention is to construct such a bag so that the animal cannot by any possibility, by quick motions of its head, throw the grain out of the bag and on the ground.

The feed bags ordinarily used are nothing more than buckets of canvas or metal in which the feed of grain is poured to a depth of several inches, and which must be large enough about the rims to enable the horse's jaws to move freely in eating. Consequently when such a bag is hung over a horse's head, the depth of the grain causes the bottom of the bag to lie a considerable distance below the lips of the horse, and as a result, after part of the grain has been consumed, the level of the grain remaining is lowered so far that it cannot be gathered by the lips of the horse. Accordingly the only way which the horse can get this grain into his mouth is by tossing his head and thereby throwing the grain upward. Although this has the effect of enabling the horse to get a little grain, nevertheless the larger proportion is thrown out through the space between the rim of the bag and the horse's head, and is lost. The pecuniary loss to teamsters and others who have horses out at work daily is considerable, but the greatest loss results from the lack of efficiency and loss of strength to the animal from insufficient feeding. This not only makes the horse incapable of doing the normal amount of work during the afternoon, but effects a permanent injury in the long run. Sometimes also either through accident or in the attempt to diminish the waste of the feed, the feed-bag is hung so high as to bury the horse's nose in the grain, making breathing difficult. Then in order to obtain relief, the horse throws his head about, and the same result of loss of the grain follows.

My invention has the double effect of making loss of the grain impossible in case the horse should move his head suddenly, and of making such movements unnecessary for securing a mouthful at any time until the grain is entirely consumed.

In carrying out my invention, I provide a feed bag with an external reservoir through which grain is fed into the bag a little at a time as it is consumed, and also by providing a device for closing the top of the bag around the horse's head, while freely permitting the movement of the jaws necessary for eating.

The preferred embodiment of the invention is illustrated in the accompanying drawings, in which,—

Figure 1 represents a feed-bag in elevation as it appears when in use. Fig. 2 represents an elevation of the bag alone, on a larger scale. Fig. 3 represents a perspective view of the bag. Fig. 4 represents a section of the bag on line 4—4 of Fig. 2. Fig. 5 represents a section on line 5—5 of Fig. 4.

The same reference characters indicate the same parts in all the figures.

The bag is made with a stiff bottom $a$ and a tubular body $b$ of which the upper portion $c$ is flexible, and adapted to be gathered closely about the jaws of the horse when in use. Preferably the body portion is entirely made from a piece of flexible fabric, such as canvas or duck, tacked at the lower edge to the sides of the bottom $a$ and the ends sewed together by a seam $d$ at the back of the bag. It is to be understood, however, that other materials may equally well be used, and it is within the contemplation of the invention to make the bottom of the body of non-corrodible metal or some other material which will not be injured by moisture, and the upper part of a flexible fabric.

Around the top $c$ of the bag somewhat below the rim thereof passes a flexible band $e$ which is led through loops $f$ and $g$ at the front and back, and through rings or other comparatively frictionless guides $h$ $i$ at the sides. At each side of the bag there are two of these guides, which, when rings are used, pass through holes in a plate $j$ of strong textile fabric or metal suitably secured to the body of the bag. Between the guides $h$ $i$ at each side of the bag, the band $e$ is connected to a head-band $k$ which passes over the horse's head and serves to support the bag in place. If desired, the band $e$, which is preferably a cord, may be long enough so that a bight on it led from between the rings $h$ $i$, may pass entirely over the animal's head, but I prefer to make the band $k$ in the form of a separate strap which is connected to bights $e'$ $e^2$ of the cord $e$ as shown in Fig. 3. As will be evident, the weight of the bag is supported by the band $e$ which is caused, by reason of the guides $h$ and $i$, to press inward on all parts of the periphery of the bag and draw the rim thereof close about the horse's head, thus closing the space through which the grain might be thrown out. The tension of the cord, however, does not interfere with the movement of the jaws in eating, because the weight of the bag and the feed produce a yielding pull whereby the cord $e$ is adapted to give when the jaws are opened.

Extending from the rear of the bag is a receptacle $l$ in which the feed of grain is placed. This receptacle extends through an unsewed part of the seam $d$ and is stitched to the adjacent portions $m$ $n$ of the bag body $b$. There is thus formed an orifice $o$ through which the grain may run from the receptacle into the bag. By suitably cutting and fitting, the orifice may be made of any dimensions between a circle or ellipse and a mere slit, so that as free or as restricted a flow of the grain as required may be obtained. The upper end $p$ of the receptacle is closed and is adapted to be hung from a part of the harness of the animal, such as the hames. Preferably the attachment between the receptacle and the hame consists of a spring $q$ having an eye $q'$, the spring being adapted to yield and prevent the receptacle being torn or the attachment with the hame broken when the horse lowers his head quickly.

In filling the bag, the feed of grain is first poured into the bag and is then poured through the opening $o$ into the receptacle $l$, leaving the body portion practically empty. The bag is then hung over the horse's head with the bottom $a$ close to the lips of the animal, and the grain runs through the aperture $o$ substantially as fast as it is consumed. In order that all the grain may not be discharged immediately from the receptacle, the latter is made with a sagging portion $l'$ which lies below the bottom $a$ of the bag when the horse's head is raised, and retains a considerable quantity of grain. In order to get this grain into the main portion of the bag, it is only necessary for the horse to lower his head.

From the foregoing it will be apparent that the construction of my improved feed-bag is such as to render tossings of the head of the animal unnecessary for securing grains, ince the fact that the grain is contained in the receptacle $l$ enables the bottom of the bag to be hung within reach of the lips or tongue of the animal. Restive or uneasy horses who toss their heads from habit, however, are unable to throw out the grain, because of the band $e$ which closes the top of the bag, and which is drawn tighter by the inertia of the bag whenever the horse raises his head quickly. As the bottom of the bag is hung so near the end of the horse's nose, there is very little play, and consequently the momentum of the bag at the end of an upward movement cannot cause a sufficient relaxation of the band $e$ as to permit opening of a space wide enough to emit the grain. This result is permitted because the grain is contained in the receptacle $l$.

I claim:—

1. A feed-bag having a band separate from the body of the bag surrounding the upper portion thereof, and a supporting band connected with the surrounding band.

2. A feed-bag having supporting means adapted to pass over the head of an animal, and gathering means passing around the bag and connected with the supporting means, adapted to be drawn inward by the pull of the supporting means to restrict the opening of the bag.

3. A feed-bag comprising a main body, an external receptacle for grain adapted to feed its contents gradually into the body, whereby the depth of grain in the bag may be kept always at a low point, and a hanger for the bag having connected encircling means extending around the upper portion of the body adapted to draw the rim thereof inward.

4. A feed-bag comprising a main body, a hanger adapted to support the bag, a connected external member passing about the upper part of the bag connected to said hanger, and guides through which said member is passed, whereby a pull on the hanger causes it to draw the rim inward, and an external receptacle having an opening into the bag, adapted to contain grain and to admit the same in small quantities to the main portion of the bag, whereby the bag may be hung from the head of a horse with elimination of capacity for up-and-down play.

5. A feed-bag comprising a main portion adapted to be hung from the head of a draft animal, having a narrow slit at the rear, and an elongated receptacle with a narrow outlet at one end secured to the main portion at the sides of such slit, the end opposite to the outlet being adapted to be hung from a portion of the harness at a distance from the animal's head, whereby a movement of the main portion in a direction such as to pull on the receptacle will draw the sides of the slit together and contract the outlet of the receptacle.

6. A feed-bag comprising a main portion having a partly sewed seam at the rear side, an elongated external receptacle closed at one end and having a narrow outlet at the other end, said outlet end being passed through the unsewed portion of said seam and fastened to the adjacent edges of the main portion, the said main portion of the bag being adapted to be hung from the head of an animal, and the closed end of the receptacle from a point near the shoulder of said animal, and a spring hanger connected with the closed end of the receptacle for connection with a part of the harness, whereby the receptacle may be yieldingly supported and protected from injury.

7. A feed-bag having external guides, a band passing around the bag through said guides, and a hanger extending from said band between adjacent guides at opposite sides of the bag, adapted to be passed over the head of a draft animal and to support the bag, the pull of the hanger being changed in direction by said guides and causing the band to be drawn inward, restricting the opening of the bag.

8. A feed-bag having a pair of adjacent guides on opposite sides, a gathering band passing externally about the bag and led through said guides, and a supporting band or strap connected to the portions of the gathering band between the guides of each pair, adapted to support the weight of the bag and in so doing, to draw off portions of the gathering band and tighten the latter about the bag, restricting the opening thereof.

9. A feed-bag, a plate secured at opposite points on the sides thereof, guide rings attached to the plates, a cord passing around the bag through the guide rings, and a strap connected to the cord between adjacent rings, adapted to pass over the head of a draft animal and support the bag.

In testimony whereof I have affixed my signature, in presence of two witnesses.

ADDINGTON B. HAMILTON.

Witnesses:
ARTHUR H. BROWN,
A. C. RATIGAN.